United States Patent
Takagi et al.

(10) Patent No.: US 7,187,514 B2
(45) Date of Patent: Mar. 6, 2007

(54) MAGNETIC HEAD ASSEMBLY AND MAGNETIC DISC DEVICE

(75) Inventors: Susumu Takagi, Saijo (JP); Yoshiaki Mizoh, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/537,551

(22) PCT Filed: Nov. 28, 2003

(86) PCT No.: PCT/JP03/15302

§ 371 (c)(1),
(2), (4) Date: Jun. 3, 2005

(87) PCT Pub. No.: WO2004/051652

PCT Pub. Date: Jun. 17, 2004

(65) Prior Publication Data

US 2006/0066978 A1    Mar. 30, 2006

(30) Foreign Application Priority Data

Dec. 4, 2002 (JP) ............................... 2002-352382

(51) Int. Cl.
*G11B 21/02* (2006.01)

(52) U.S. Cl. ........................................ 360/75

(58) Field of Classification Search ............... 360/75, 360/61, 31, 236.5, 77.02, 78.04, 234.3; 374/185; 72/9.3
See application file for complete search history.

(56) References Cited

U.S. PATENT DOCUMENTS 3,625,036 A * 12/1971 Fapiano ..................... 72/9.3
5,991,113 A * 11/1999 Meyer et al. ............... 360/75

(Continued)

FOREIGN PATENT DOCUMENTS

JP    7-65525    3/1995

(Continued)

*Primary Examiner*—Fred F. Tzeng
(74) *Attorney, Agent, or Firm*—Steptoe & Johnson LLP

(57) ABSTRACT

The present invention implements a magnetic disk drive usable under a wide range of temperature environment conditions, and a magnetic head assembly. The flying height of a magnetic head slider (1) can be controlled against a change of temperature so that the flying height of the magnetic head slider (1) is low at low temperatures and high at high temperatures, thereby the variations of the coercivity of a magnetic disk (2) can be cancelled. Further, by setting the rate of change of the crown value with respect to the change of temperature to 0.26 to 0.62 nm/° C., the flying height can be controlled so that the flying height becomes low at low temperatures and high at high temperatures, while maintaining the uniformity of the profile of the flying height of the magnetic head slider (1) from the inner periphery to the outer periphery of the magnetic disk (2).

27 Claims, 11 Drawing Sheets

U.S. PATENT DOCUMENTS

| | | | |
|---|---|---|---|
| 6,344,949 B1 * | 2/2002 | Albrecht et al. | 360/236.5 |
| 6,567,229 B1 * | 5/2003 | Mallary et al. | 360/75 |
| 6,665,077 B1 * | 12/2003 | Stirniman et al. | 356/507 |
| 6,804,010 B1 * | 10/2004 | Stirniman | 356/507 |
| 6,906,878 B2 * | 6/2005 | Smith et al. | 360/31 |
| 7,009,800 B2 * | 3/2006 | Yang | 360/75 |
| 7,027,263 B2 * | 4/2006 | Ottesen et al. | 360/234.4 |
| 7,042,670 B2 * | 5/2006 | Feng et al. | 360/75 |
| 7,046,473 B2 * | 5/2006 | Fu et al. | 360/75 |
| 2003/0058559 A1 * | 3/2003 | Brand et al. | 360/31 |
| 2005/0024775 A1 * | 2/2005 | Kurita et al. | 360/234.3 |
| 2005/0129090 A1 * | 6/2005 | Sheperek et al. | 374/185 |
| 2005/0185312 A1 * | 8/2005 | Ueda et al. | 360/31 |
| 2006/0023331 A1 * | 2/2006 | Flechsig et al. | 360/61 |
| 2006/0044669 A1 * | 3/2006 | Shimizu et al. | 360/75 |
| 2006/0092570 A1 * | 5/2006 | Payne et al. | 360/236.5 |

FOREIGN PATENT DOCUMENTS

| | | |
|---|---|---|
| JP | 7-153049 | 6/1995 |
| JP | 7-320435 | 12/1995 |
| JP | 8-106749 | 4/1996 |
| JP | 9-231698 | 9/1997 |
| WO | WO 99/48098 | 9/1999 |

* cited by examiner (a)

$T=T_1$ $(dT=T_1-T_0<0)$ (b1)

(c1)

$T=T_2$ $(dT=T_2-T_0>0)$ (b2)

(c2)

FILM THICKNESS OF THIN FILM TO
SLIDER FILM THICKNESS

MAGNETIC HEAD ASSEMBLY AND MAGNETIC DISC DEVICE

The present application is based on International Application PCT/JP2003/015302, filed Nov. 28, 2003, which application is incorporated herein by reference in its entirety.

TECHNICAL FIELD

The present invention relates to a magnetic disk drive for writing to and reading from a magnetic disk using a magnetic read/write element on a magnetic head slider by operating an actuator mechanism having a magnetic head assembly at the tip while rotating the magnetic disk and moving a position of the magnetic head slider with respect to the magnetic disk, and relates to a magnetic head assembly which is used in this magnetic disk drive and comprises a head slider and a suspension.

BACKGROUND ART

Generally, as shown in FIG. 16, a magnetic disk drive is provided with a magnetic head assembly 3, which further comprises a magnetic head slider 1 and a suspension, a magnetic disk 2, magnetic disk rotation drive means 16, such as a spindle motor, and an actuator mechanism 13 (including a bearing 14 and voice coil motor) for moving the magnetic head assembly 3 along the information recording surface of the magnetic disk 2, which are housed in a body 17 made of such metal as an aluminum alloy.

FIG. 17 is a diagram viewing the magnetic head assembly 3 from the magnetic disk side, and FIG. 18 is an exploded perspective view of the magnetic head assembly 3 in FIG. 17. In FIG. 17 and FIG. 18 the suspension 4 comprises a flexure 5 further comprising a plate spring 9, which is a plate holding the magnetic head slider 1 at the tip area and a flexible circuit 8, and a load beam 10 for supporting the tip of the flexure 5 with a dimple 12.

The magnetic head slider 1 has a magnetic read/write element for reading and writing data from/to the magnetic recording medium, and which very slightly floats over the magnetic disk 2 by an air flow which is generated by the rotation of the magnetic disk 2. The magnetic head slider 1 comprises a positive pressure generation section and a negative pressure generation section on the surface facing the magnetic disk 2, which are designed such that the floating profile on the entire magnetic disk 2 becomes constant under a predetermined temperature and pressure, because of the static load from the suspension 4 and the balance of the positive pressure and negative pressure generated by the magnetic head slider 1.

Conventionally the operating temperature range of a magnetic disk drive is limited to 5° C. to 55° C., for example, in terms of the reliability of the device and magnetic reading/writing, and normal operation is guaranteed on the assumption that the user of the magnetic disk drive will pay attention to the operation environment thereof.

In the case of a magnetic disk drive installed in a car navigation system, for example, the magnetic device is installed directly behind a motor fan, for example, in the car navigation system, so that when temperature is higher than the guaranteed temperature range of the magnetic disk drive, air cooling is performed by the motor fan, and when the temperature in the car navigation system abnormally rises, the magnetic disk drive and car navigation system shut down so as to avoid the loss of information on the magnetic disk drive. On the other hand, if the temperature is lower than the guaranteed range, the coercivity of the magnetic disk 2 increases, which makes writing difficult even if the reading of information is without problems, so the writing operation is disabled until the temperature of the magnetic disk drive becomes higher than the predetermined temperature by the heater of the vehicle main body (e.g. see Masahiko Takizawa and other: "Application of HDD to navigation", Pioneer Technical Information Magazine, 2002, Vol. 12, No. 1 [Online] [searched on Oct. 1, 2002], Internet <http://www-.pioneer.co.jp/crd1/rd/pdf/12-1-3.pdf>).

A reason why the operating temperature range of the magnetic disk drive is limited to about 5° C.–55° C. is that the coercivity of the magnetic disk 2, which records and holds information, has a temperature dependency, as described above (e.g. see Tao Pan, Geoffrey W. D. Spratt, Li Tang, Li-Lien Lee, Yong Change Feng and David E. Laughlin, "Temperature dependence of coercivity in Co-based longitudinal thin-film recording media," J. Appl. Phys., 81 (8), 15 Apr. 1997, pp. 3952–3954, [online], [searched on Oct. 1, 2002], Internet <http://neon.mems.cmu.edu/laughlin/pdf/201.pdf>), and since the current recording density of the magnetic disk drive reaches 50 gigabit/inch square, it is said that the increase of the recording density is about 100% at an annual rate, and as the recording density increases the magnetic disk drive has been optimized by increasing the coercivity of the magnetic disk 2 in order to hold the recording information stably in this small recording area. FIG. 19 shows an example of the temperature dependency of the coercivity of the magnetic disk 2. In the example of FIG. 19, the coercivity increases about 9% by decreasing the temperature from room temperature (25° C.) to −25° C., and the coercivity decreases about 10% by increasing the temperature from room temperature (25° C.) to +75° C. The coercivity changes about 19% in the temperature range of −25° C. to +75° C., and the coercivity changes about 29% in the temperature range of −50° C. to +100° C. Therefore when data is recorded in a low temperature status using a magnetic head slider 1, which was optimized to appropriate overwrite characteristics in a room temperature status, sufficient writing cannot be performed in a coercivity from the head slider 1, and when data is recorded in a high temperature status, on the other hand, the leakage magnetic field from the magnetic head slider 1 becomes relatively too high with respect to the coercivity of the magnetic disk 2, and the area to be recorded by the magnetic head slider 1 becomes larger than the area to be recorded at room temperature, so such a problem as overwriting the recording information on an adjacent area occurs. Therefore in the present status the operating range of the magnetic disk drive is limited to about 5° C.–55° C.

The change of temperature in the magnetic disk drive also influences the flying height characteristics of the magnetic head slider 1. FIG. 20 shows a typical shape of the magnetic head slider 1. The magnetic head slider 1 comprises an inflow end 18 of air at the front part and an outflow end 19 of air at the back part, and an air bearing surface is created using the air flow which flows into the micro-space between the magnetic head slider 1 and the magnetic disk 2. Specifically, the magnetic head slider 1 has steps 21 at the inflow end 18 and at the front part of the surface facing the magnetic disk 2 of the magnetic head slider 1 which protrudes the most, these steps are called the rail 22 and the pad 23, and positive pressure is generated at the area called the rail 22 and the pad 23 by compressing air which flows in from the inflow end 18, and negative pressure is generated at a concave area called the cavity 24. Also a magnetic reading/writing element 20 is installed near the outflow end 19.

The magnetic head slider 1 has a curved surface called the crown, and this crown shape deforms according to the temperature, which depends on the difference of thermal expansion coefficients between the material of the magnetic head slider 1 and that of the plate spring 9, which is a thin plate used to adhere to and support the magnetic head slider 1. Normally this crown shape deforms in the plus direction indicated by the arrow mark in FIG. 20(*b*) at low temperatures, in other words the convex section protrudes more, and the crown shape deforms in the minus direction at high temperatures, in other words the convex section flattens (e.g. see Japanese Patent Application Laid-Open No. H9-231698, page 9, FIG. 11 and FIG. 12).

The influence of the change of the crown on flying height can be determined by actually measuring the flying height or by numerical analysis, but it is known that the flying height increases as the crown changes to the plus, and the flying height decreases as the crown changes to the minus.

At the moment the amount of air gap between the magnetic head slider 1 and the magnetic disk 2, that is the flying height of the magnetic head slider 1 with respect to the magnetic disk 2, drops to about 15 nm to implement high recording density, and one factor causing contact between the magnetic head slider 1 and the magnetic disk 2 is the change of flying height, which is caused by the change of the crown due to the change of temperature. As a technology to decrease the change of flying height caused by temperature, a technology of using a temperature compensation element to stabilize the change of the crown value caused by temperature was disclosed (e.g. see Japanese Patent Application Laid-Open No. H7-153049). Also a technology of using the difference of the thermal expansion coefficients between the plate spring 9, which is a thin plate for adhering the magnetic head slider 1, and the magnetic head slider 1, so as to stabilize the change of the crown value by temperature, was disclosed (e.g. see Japanese Patent Application Laid-Open No. H7-320435, Japanese patent Application Laid-Open No. H7-65525 and Japanese Patent Application Laid-Open No. H7-307068). By using these technologies, the change of the crown value of the magnetic head slider 1 caused by the change of temperature can be suppressed.

As a prior art to solve the problem of the reliability of magnetic reading/writing which is caused by the change of the coercivity of the magnetic disk 2 due to the change of temperature, and the problem of the reliability of the magnetic disk drive caused by the flying height of the magnetic head slider 1 due to the change of temperature, a technology of providing a temperature sensor and heater and a Peltier element to the magnetic disk drive so as to heat and cool according to the external temperature, and providing a double structured outer shell so that the internal environment is independent from the external environment, was disclosed (e.g. see Japanese Patent Application Laid-Open No. 2002-245749). By using this prior art, the internal environment can be controlled independently from the external environment, and the magnetic disk drive can be used under wider external environments without diminishing the reliability.

Thus far magnetic disk drives have been largely used indoors, and the operation guaranteed temperature range of 5° C. to 55° C. caused little problems for magnetic disk drives. However now applications which are different from conventional usage are already emerging, such as installing a magnetic disk drive in a car navigation system, and it is expected that using magnetic disk drives under more severe environments will increase. For example, under extremely low temperatures below −20° C., or at high temperatures exceeding 70° C., conventional magnetic disk drives have problems of reliability of magnetic recording because of the temperature dependency of the coercivity of the magnetic disk 2, and there is the problem of reliability of the magnetic disk drive in terms of the stability of the flying height of the magnetic head slider.

Another technology disclosed is making the magnetic disk drive independent from the change of the environment outside the device, and controlling the magnetic disk drive using a temperature sensor and a heating/cooling mechanism, so as to support a wide range of external environments, but with this configuration not only these additional elements are required but also a delay is generated when the magnetic disk is started because temperature is controlled for the internal temperature of the magnetic disk drive to be within an operable range. If a double structured outer shell is used to make the external environment and internal environment independent from each other, the size and weight of the magnetic disk drive itself increases, which is not appropriate for an application where portability is important.

For stabilizing flying height, a technology for controlling the change of flying height of the magnetic head slider 1 caused by the change of the temperature by decreasing the change of the crown value caused by temperature was disclosed, but in the case of the current magnetic head slider 1 using negative pressure, if the change of the crown value is decreased with respect to temperature, then the stability of flying height cannot be uniform on the entire surface of the magnetic disk 2, and this was clarified by an analysis of the flying height of the magnetic head slider 1 using a modified Reynolds equation by the present inventor. FIG. 21 shows the analysis result of the flying height of the magnetic head slider 1 with respect to the change of temperature when the crown value does not change. The abscissa indicates the position of the magnetic head slider 1 in the radius direction with respect to the magnetic disk 2, and the ordinate indicates a normalized flying height which was normalized by the flying height of the magnetic head slider 1 at 25° C. At high temperatures the flying height becomes high when the magnetic head slider 1 is at the outer periphery of the magnetic disk 2, and at low temperatures the flying height becomes high when the magnetic head slider 1 is at the inner periphery of the magnetic disk 2. The change of flying height caused by temperature is highest at the outer periphery, which is 10%, and the flying height changes about 8% from the inner periphery to the outer periphery at the time of low temperatures and at the time of high temperatures. This large change of flying height from the inner periphery to the outer periphery is not desirable in terms of both the reliability and efficiency of magnetic reading/writing and the reliability of the magnetic disk drive. In other words, if the flying height changes considerably from the inner periphery to the outer periphery, the spacing loss factor of the magnetic reading/writing caused by flying cannot be uniform between the inner periphery and outer periphery, and the efficiency of the magnetic reading/writing deteriorates at a position of the inner periphery or outer periphery where the flying height increases. In terms of the reliability of magnetic reading/writing, if the flying height drops further at the inner periphery side when the coercivity of the magnetic disk 2 is dropping at high temperature status, for example, the write magnetic field could become too strong. In terms of the reliability of the magnetic disk drive, the flying height decreases at the outer periphery at low temperatures, and the flying height decreases at the inner periphery at high temperatures, so the contact of the magnetic head slider 1 and the magnetic disk 2 is a concern at both low temperatures and high temperatures, and optimization for the reliability of the magnetic disk drive is required for both low temperatures and high temperatures, which makes optimization of the magnetic disk drive difficult.

With the foregoing in view, it is an object of the present invention to provide a magnetic disk drive which decreases the difference of the change of the flying height at the inner and outer peripheries of a magnetic head slider 1 caused by the change of temperature, and can operate in environmental conditions which are wider than prior art without using an outer shell and the additional elements of a heating and cooling mechanism, and without causing a delay due to temperature control at startup of the magnetic disk drive, and a magnetic head assembly 3 to be used for this magnetic disk drive.

DISCLOSURE OF THE INVENTION

To solve the above mentioned conventional problems, the magnetic disk drive of the present invention is a magnetic disk drive comprising: a magnetic head slider on which a magnetic read/write element to read and write information is mounted; a suspension comprising a plate spring which is a thin plate for adhering to and supporting the magnetic head slider, a flexible circuit and a load beam; a magnetic disk for holding information; a rotation drive means of the magnetic disk; and an actuator mechanism for moving a magnetic head assembly which comprises the magnetic head slider and the suspension along the information recording surface of the magnetic disk, wherein the magnetic disk drive further comprises means for changing a flying height of the magnetic head slider with respect to the magnetic disk according to the temperature in the magnetic disk drive, and the magnetic disk drive further comprises a means of particularly decreasing the flying height from the flying height at room temperature (25° C.) when the temperature is lower than the room temperature, and increasing the flying height from the flying height at room temperature when the temperature is higher than the room temperature.

The magnetic disk drive of the present invention is also a magnetic disk drive comprising: a magnetic head slider on which a magnetic read/write element to read and write information is mounted; a suspension comprising a plate spring which is a thin plate for adhering to and supporting the magnetic slide, a flexible circuit and a load beam; a magnetic disk for holding information; rotation drive means of the magnetic disk; and an actuator mechanism for moving a magnetic head assembly which comprises the magnetic head slider and the suspension along the information recording surface of the magnetic disk, wherein the magnetic disk drive further comprises a structure for generating stress in the magnetic head assembly by the change of temperature, and the crown value of the magnetic head slider is decreased when the temperature is lower than the room temperature (25° C.), and the crown value of the magnetic head slider is increased when the temperature is higher than the room temperature.

The magnetic head assembly of the present invention is a magnetic head assembly comprising: a magnetic head slider on which a magnetic read/write element to read and write information is mounted, a plate spring which is a thin plate for adhering to and supporting the magnetic head slider, a flexible circuit, and a load beam, characterized in that $-13.2\times10^{-5}/°$ C.$<\alpha_1-\alpha_2<-5.5\times10^{-5}/°$ C. is satisfied as a relationship of the thermal expansion coefficient of $\alpha_1$ of the plate spring and the thermal expansion coefficient $\alpha_2$ of the magnetic head slider 1.

The magnetic disk drive of the present invention is also a magnetic disk drive comprising: a magnetic head slider on which a magnetic read/write element to read and write information is mounted; a suspension comprising a plate spring which is a thin plate for adhering to and supporting the magnetic head slider, a flexible circuit and a load beam; a magnetic disk for holding information; rotation drive means of the magnetic disk; and an actuator mechanism for moving a magnetic head assembly which comprises the magnetic head slider and the suspension along the information recording surface of the magnetic disk, wherein $-13.2\times10^{-5}/°$ C.$<\alpha_1-\alpha_2<-5.5\times10^{-5}/°$ C. is satisfied as a relationship of the thermal expansion coefficient $\alpha_1$ of the plate spring and the thermal expansion coefficient $\alpha_2$ of the magnetic head slider 1.

The magnetic head assembly of the present invention is also a magnetic head assembly comprising: a magnetic head slider on which a magnetic read/write element to read and write information is mounted, a plate spring which is a thin plate for adhering to and supporting the magnetic head slider, a flexible circuit, and a load beam, wherein a thin film with a smaller thermal expansion coefficient than that of the material of the magnetic head slider is formed on the rear face of the sliding face of the magnetic head slider for a magnetic disk.

The magnetic disk drive of the present invention is also a magnetic disk drive comprising: a magnetic head slider on which a magnetic read/write element to read and write information is mounted; a thin film formed on the rear face of the sliding face of the magnetic head slider for a magnetic disk; a suspension comprising a plate spring which is a thin plate for adhering to and supporting the rear face of the magnetic head slider via the thin film, a flexible circuit and a load beam; a magnetic disk for holding information: rotation drive means of the magnetic disk; and an actuator mechanism for moving a magnetic head assembly which comprises the magnetic head slider and the suspension along the information recording surface of the magnetic disk, wherein the thermal expansion coefficient of the thin film is smaller than the thermal expansion coefficient of the magnetic head slider.

The magnetic head assembly of the present invention is also a magnetic head assembly comprising: a magnetic head slider on which a magnetic read/write element to read and write information is mounted, a plate spring which is a thin plate for adhering to and supporting the magnetic head slider, a flexible circuit, and a load beam, wherein the plate spring which is a thin plate for adhering to and supporting the magnetic head slider is constructed as a bi-metal structure of two thin plates with different thermal expansion coefficients.

The magnetic disk drive of the present invention is also a magnetic disk drive comprising: a magnetic head slider on which a magnetic read/write element to read and write information is mounted; a suspension comprising a plate spring which is a thin plate for adhering to and supporting the magnetic head slider, a flexible circuit and a load beam; a magnetic disk for holding information: rotation drive means of the magnetic disk; and an actuator mechanism for moving a magnetic head assembly which comprises the magnetic head slider and the suspension along the information recording surface of the magnetic disk, wherein the plate spring which is a thin plate for adhering to and supporting the magnetic head slider is constructed as a bi-metal structure of two thin plates with different thermal expansion coefficients.

The magnetic disk drive of the present invention is also a magnetic disk drive comprising: a magnetic head slider on which a magnetic read/write element to read and write information is mounted; a suspension comprising a plate spring which is a thin plate for adhering to and supporting the magnetic head slider, a flexible circuit and a load beam; a magnetic disk for holding information: rotation drive means of the magnetic disk; and an actuator mechanism for moving a magnetic head assembly which comprises the magnetic head slider and the suspension along the information recording surface of the magnetic disk, wherein the magnetic disk drive further comprises temperature detection means for detecting the internal temperature of the magnetic disk drive, and flying height control means for changing the flying height of the magnetic head slider with respect to the magnetic disk based on the temperature detection result by the temperature detection means.

The magnetic disk drive of the present invention is also a magnetic disk drive comprising: a magnetic head slider on which a magnetic read/write element to read and write information is mounted; a suspension comprising a plate spring which is a thin plate for adhering to and supporting the magnetic head slider, a flexible circuit and a load beam; a magnetic disk for holding information; rotation drive means of the magnetic disk; and an actuator mechanism for moving a magnetic head assembly which comprises the magnetic head slider and the suspension along the information recording surface of the magnetic disk, wherein the magnetic disk drive further comprises temperature detection means for detecting the internal temperature of the magnetic disk drive, and crown value control means for changing the crown value of the magnetic head slider based on the temperature detection result by the temperature detection means.

As described above, according to the magnetic disk drive and magnetic head assembly of the present invention, stable magnetic reading and writing is possible under a wider range of temperature environmental conditions compared with prior art, and magnetic disk drives, which can be used even under environments where the use of magnetic devices was conventionally difficult, can be implemented.

BEST MODE FOR CARRYING OUT THE INVENTION

Embodiments of the magnetic head assembly and the magnetic disk drive of the present invention will now be described in detail with reference to the drawings.

(Embodiment 1)

Figure 1:
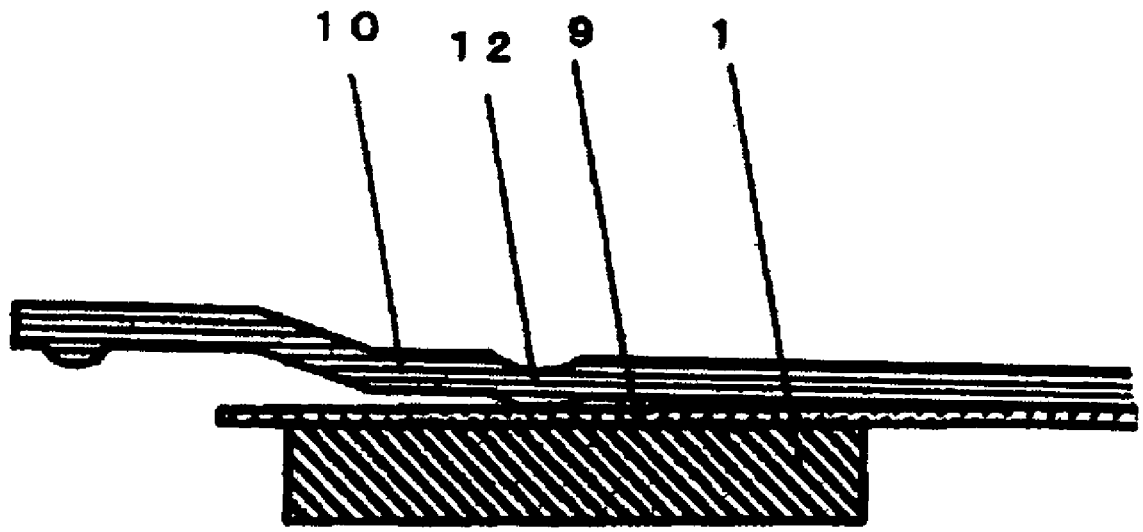
FIG. 1 is a cross-sectional view depicting a magnetic head assembly according to Embodiment 1 of the present invention.

FIG. 1 is a diagram depicting the configuration of the magnetic head assembly 3 according to the first embodiment of the present invention. In FIG. 1, the magnetic head slider 1 is adhered to the plate spring 9 which is a flexure thin plate, and the plate spring 9 contacts the load beam 10 via the dimple 12. The external size of the magnetic head slider 1 is about 1.2 mm×1.0 mm and the height is about 0.3 mm. The material of the magnetic head slider 1 is alumina carbide titanate, and the thermal expansion coefficient of alumina carbide titanate is $7.8 \times 10^{-6}$/° C. The plate spring 9, which is a flexure thin plate, is made of a 36Ni—Fe alloy which is an alloy of nickel and iron. The thermal expansion coefficient of this alloy is $1.2 \times 10^{-6}/°$ C.

The operation and function of the magnetic head assembly 3 constructed as above will now be described with reference to FIG. 2–FIG. 11.

Figure 2:
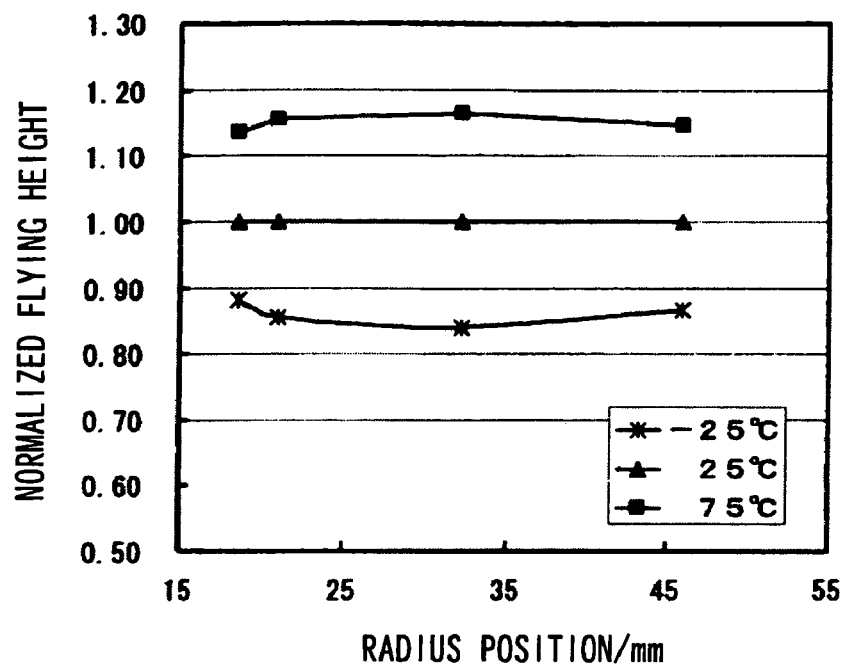
FIG. 2 is a graph depicting the relationship between temperature and flying height characteristics of the magnetic head slider according to Embodiment 1 of the present invention.

FIG. 2 shows the flying height of the magnetic head slider 1 with the configuration of the magnetic head assembly 3, analyzed using a modified Reynolds equation. Here the flying height refers to the physical air gap amount between the magnetic read/write element 20, which is installed at the air outflow end 19 of the magnetic head slider 1 and the magnetic disk 2. The abscissa indicates the position of the magnetic head slider 1 in the radius direction with respect to the magnetic disk 2, and the ordinate indicates the normalized flying height, normalized with the flying height of the magnetic head slider 1 at 25° C.

Figure 21:
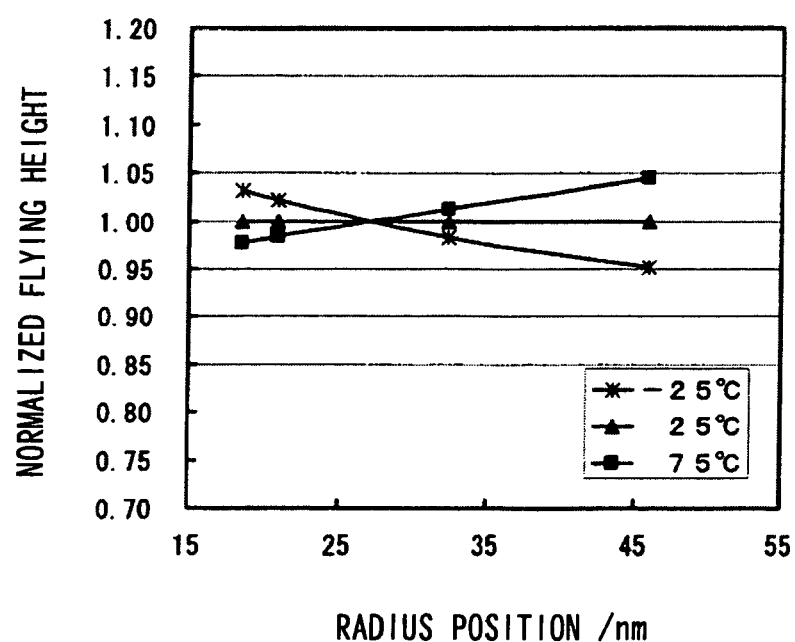
FIG. 21 is a graph depicting the relationship between the change of temperature and the normalized flying height when the crown does not change with respect to temperature.

Compared with the prior art in FIG. 21, the flying height uniformly decreases from the inner periphery to the outer periphery at low temperatures, and the flying height uniformly increases from the inner periphery to the outer periphery at high temperatures. By decreasing the flying height at low temperatures, an effective recording magnetic field, applied to the magnetic disk 2 from the magnetic head slider 1, increases, and the effect of the increase of the coercivity of the magnetic disk 2 at low temperatures can be cancelled, and by increasing the flying height at high temperatures, the effect of the decrease of the coercivity of the magnetic disk 2 can be cancelled, so more stable magnetic recording can be performed under wider temperature environmental conditions.

In the prior art, the change of flying height from the inner periphery to the outer periphery is about 8%, but if the magnetic head assembly 3 of Embodiment 1 of the present invention is used, the change of flying height from the inner periphery to the outer periphery of the magnetic head slider 1 decreases to about 4%, which is half of the prior art. This means that the present invention can make the spacing loss factor in the magnetic reading/writing uniform from the inner periphery to the outer periphery, and can improve the efficiency of the magnetic reading/writing of the magnetic disk drive.

Also the flying height from the inner periphery to the outer periphery is uniform, so optimization against contact of the magnetic head 1 and the magnetic disk 2 can be performed only at low temperatures when the flying height is low, which is advantageous to optimize the reliability of the magnetic disk drive.

The present invention will now be described in more detail using the first embodiment.

Figure 3:
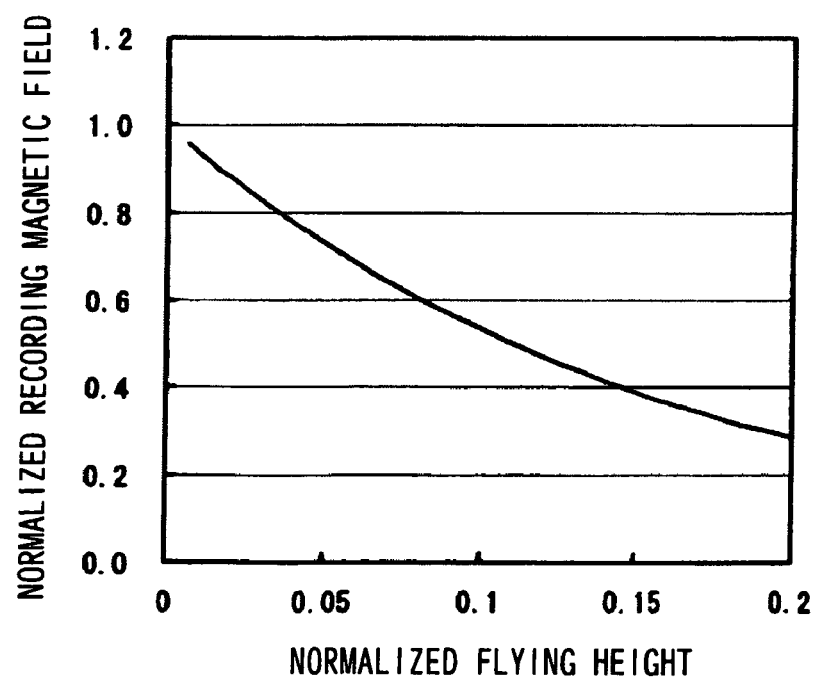
FIG. 3 is a graph depicting the relationship between normalized recording magnetic field strength and normalized flying height of the magnetic head slider.

FIG. 3 shows the relationship between the magnetic field intensity and the normalized flying height at writing by the magnetic read/write element 20 on the magnetic head slider 1. The flying height is normalized by the space between the recording poles of the magnetic read/write element 20.

Figure 4:
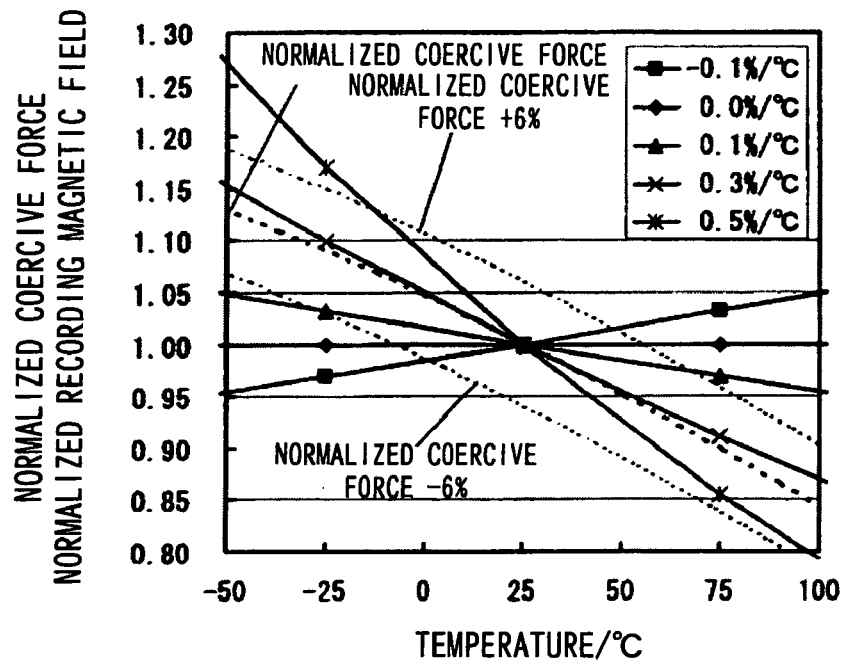
FIG. 4 is a graph depicting the relationship between normalized coercivity and temperature of a magnetic disk, and a normalized recording magnetic field of the magnetic head slider having an average rate of change of flying height of −0.1%/° C. to 0.5%/° C. with respect to temperature.

FIG. 4 shows the temperature dependency of the normalized recording magnetic field (normalized with the recording magnetic field of the magnetic head slider 1 at 25° C.) of the magnetic head slider 1 having an average rate of change of the flying height at $-0.1\%/°$ C. to $0.5\%/°$ C. determined using the above relationship between the flying height and the normalized recording magnetic field.

Here the average rate of change of the flying height is an average of the percentage of the change of the flying height per 1° C. with respect to the flying height at the room temperature (25° C.) in an arbitrary temperature range. FIG. 4 also shows the temperature dependency of the normalized coercivity of the magnetic disk 2, which is normalized with the coercivity of the magnetic disk 2 at the room temperature (25° C.). In order to cancel the change of the coercivity of the magnetic disk 2 by the change of temperature, the normalized coercivity and the normalized recording magnetic field must be on a same line, and as FIG. 4 shows, the magnetic head slider 1 having the average rate of change of the flying height $0.3\%/°$ C. is the optimum.

If the difference between the normalized recording magnetic field of the magnetic head slider 1 and the normalized coercivity of the magnetic disk 2 is defined as the difference ratio of the recording magnetic field strength with respect to the coercivity, ±6% is allowed in a general magnetic disk drive in a 5° C. to 50° C. range of the guaranteed temperature as the difference ratio of the recording magnetic field strength with respect to the coercivity. Therefore in the following description on the reliability of the magnetic recording of the magnetic disk drive in an arbitrary temperature range, the difference ratio ±6% of the recording magnetic field strength with respect to the coercivity is used for evaluation.

Figure 5:
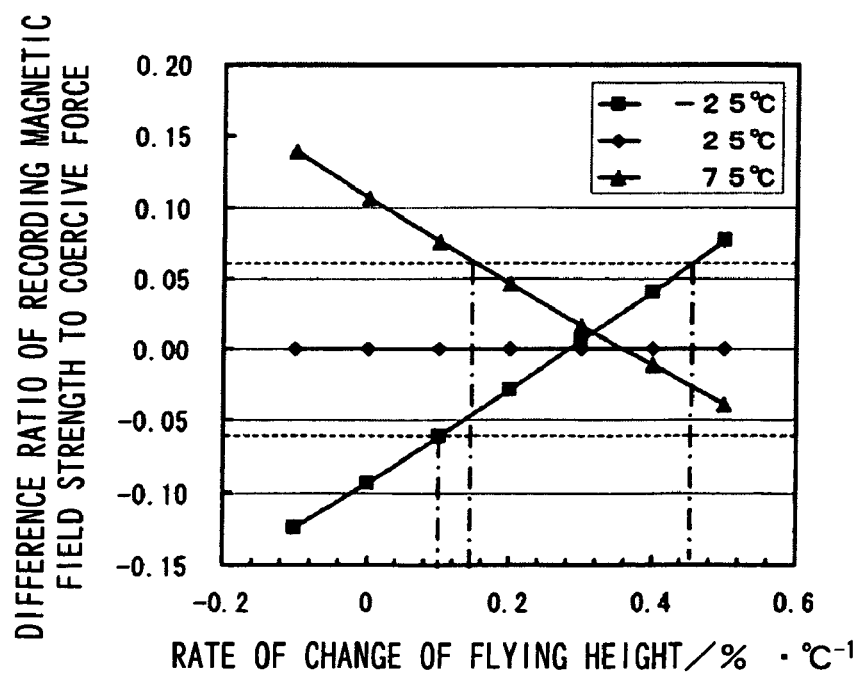
FIG. 5 is a graph depicting the difference ratio of coercivity and recording magnetic field strength with respect to the average rate of change of flying height.

FIG. 5 shows the relationship between the rate of change of the flying height and the difference ratio of the recording magnetic field intensity with respect to the coercivity. In the range where the rate of change of the flying height is $0.15\%/°$ C. to $0.45\%/°$ C., the difference ratio of the recording magnetic field strength with respect to the coercivity is ±6% or less, so by designing the rate of change of the flying height to be $0.15\%/°$ C.–$0.45\%/°$ C., magnetic recording with a high reliability can be implemented in a temperature range that is wider than the prior art ($-25°$ C. to $75°$ C. in this example).

If the rate of change of the flying height is not in a $0.15\%/°$ C. to $0.45\%/°$ C. range, and if the rate of change of flying height is $0.15\%/°$ C. or less, the recording magnetic field strength becomes relatively too strong with respect to the coercivity of the magnetic disk at high temperatures, 75° C. or higher, which affects adjacent tracks, and if the rate of change of flying height is even $0.1\%/°$ C. or less, then sufficient writing cannot be performed with the write magnetic field from the magnetic head slider not only at high temperatures but also at low temperatures, $-25°$ C. or less. If the rate of change of the flying height is $0.45\%/°$ C. or more, on the other hand, the recording magnetic field strength becomes relatively too strong with respect to the coercivity of the magnetic disk at low temperatures, which affects adjacent tracks.

In the first embodiment of the present invention, an effective rate of change of the flying height is determined assuming that the magnetic disk drive is used in a $-25°$ C. to 75° C. range, but needless to say an effective rate of change of the flying height can be determined by a similar method according to the operating temperature conditions of the magnetic disk drive, and in theory a magnetic recording with high reliability can be implemented throughout low temperature to high temperature under any operating temperature condition, by decreasing the flying height at low temperatures and increasing the flying height when optimization is performed.

Figure 6:
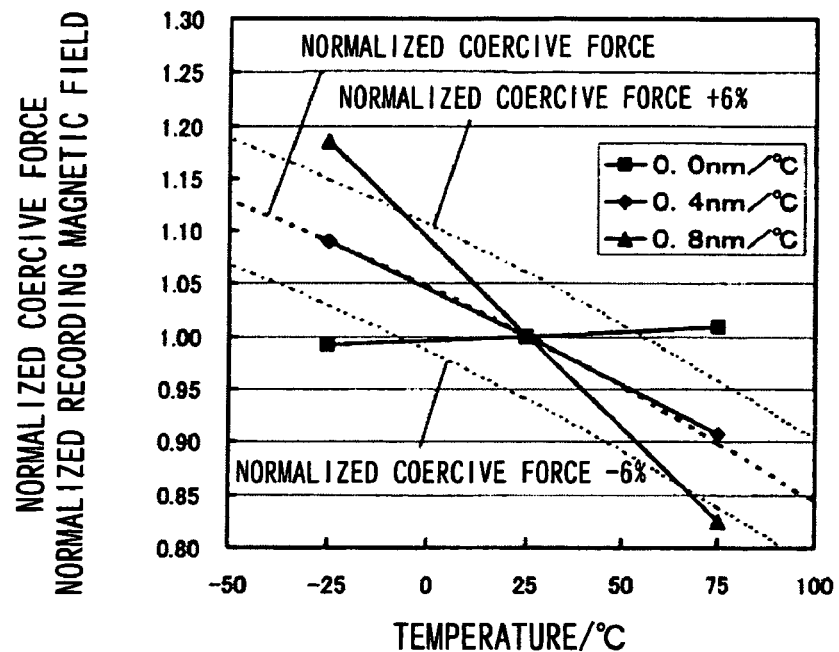
FIG. 6 is a graph depicting the relationship between normalized coercivity and temperature of the magnetic disk, and the normalized recording magnetic field of the magnetic head slider having a rate of change of a crown of 0.0 nm/° C.–0.8 nm/° C. with respect to the temperature.
Figure 7:
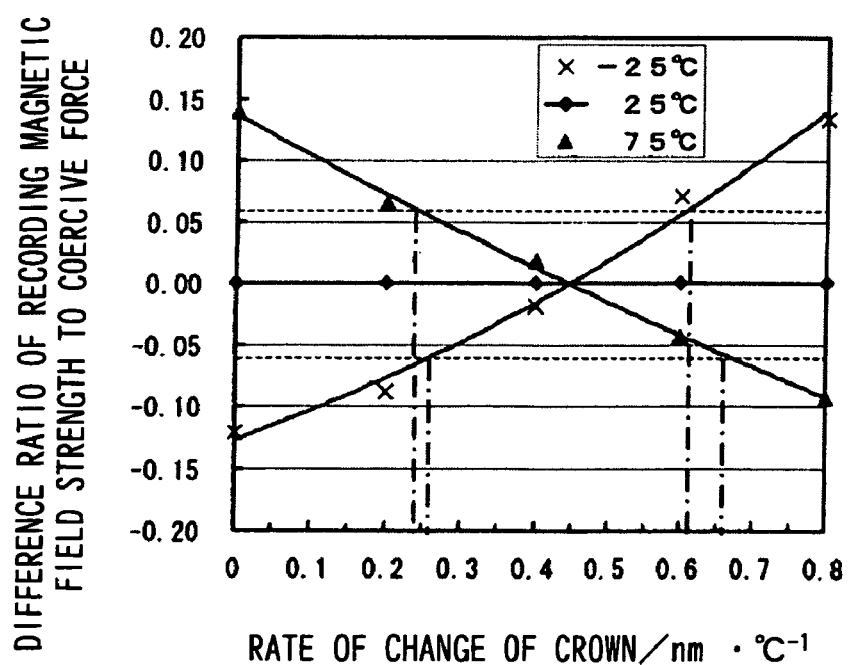
FIG. 7 is a graph depicting the difference ratio of coercivity and recording magnetic field strength with respect to the rate of change of the crown.

In the first embodiment of the present invention, a 36Ni—Fe alloy of which the thermal expansion coefficient is lower than the magnetic head slider 1 is used for the plate spring 9 of the flexure 5, so that the crown value is changed by temperature using the difference of the thermal expansion coefficients of the magnetic head slider 1 and the plate spring 9, for controlling the flying height with respect to the change of temperature, but now the analysis result of the crown change value and the difference ratio of the recording magnetic field strength with respect to the coercivity is shown in FIG. 6 and FIG. 7. Considering each temperature and the crown value at a respective temperature, the flying height was analyzed using a modified Reynolds equation, then the recording magnetic field strength was determined based on the relationship between the flying height and the normalized magnetic field strength.

FIG. 6 shows the temperature dependency of the normalized recording magnetic field and the temperature dependency of the normalized coercivity when the rates of change of the crown is 0.0 nm/° C., 0.4 nm/° C. and 0.8 nm/° C. As FIG. 6 shows, when the rate of change of the crown is 0.4 nm/° C., the temperature dependency of the normalized recording magnetic field matches the temperature dependency of the normalized coercivity the most, and the variation of the coercivity caused by the change of temperature can be cancelled. FIG. 7 shows the rate of change of the crown and the difference ratio of the recording magnetic field strength with respect to the coercivity. As FIG. 7 shows, when the rate of change of the crown is 0.26 nm/° C.–0.62 nm/° C., the difference ratio of the recording magnetic field strength with respect to the coercivity is ±6% or less, and by designing the rate of change of the crown to be 0.26 nm/° C.–0.62 nm/° C., a magnetic recording with high reliability can be implemented in a temperature range wider than the prior art (−25° C. to 75° C. in this example). If the rate of change of the crown is not in a 0.26 nm/° C. to 0.62 nm/° C. range, and if the rate of change of the crown is 0.26 nm/° C. or less, sufficient writing cannot be performed with the write magnetic field from the magnetic head slider at low temperatures, −25° C. or less, and if the rate of change of the crown is 0.62 nm/° C. or more, on the other hand, the recording magnetic field strength becomes relatively too strong with respect to the coercivity of the magnetic disk at high temperatures, 75° C. or higher, which affects adjacent tracks.

For the rate of change of the crown as well, just like the case of the rate of change of the flying height, an effective rate of change of the crown can be determined in a similar way according to the operating temperature conditions of the magnetic disk drive, and in theory a magnetic recording with high reliability can be implemented throughout low temperatures to high temperatures under any operation temperature condition by setting the crown to low at low temperatures so as to decrease the flying height, and by setting the crown to high at high temperatures so as to increase the flying height when optimization is performed.

Now the rate of change of the crown and the configuration of the magnetic head assembly 3 will be studied. First the change of the crown by the change of the temperature depending on the difference of the thermal expansion coefficients between the magnetic head slider 1 and the plate spring 9 will be described with reference to FIG. 8.

It is assumed that at temperature $T=T_0$, the length of the magnetic head slider of the magnetic head assembly 3 is $l_0$, the thickness thereof is $t_2$, the thermal expansion coefficient thereof is $\alpha_2$, the thickness of the plate spring 9 is $t_1$, and the thermal expansion coefficient thereof is $\alpha_1$, and $\alpha_1 < \alpha_2$ (see FIG. 8(a)).

Figure 8:
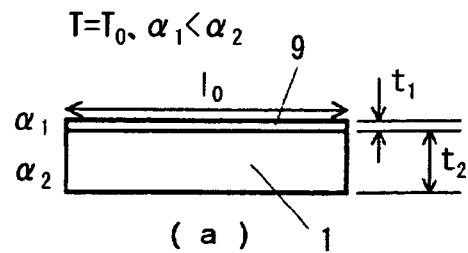
FIG. 8 illustrates the change of crown value caused by the change of temperature.
Figure 8:
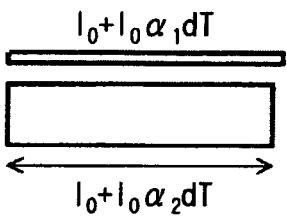
Figure 8:
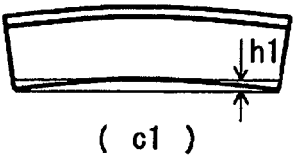
Figure 8:
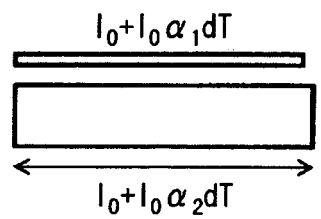
Figure 8:
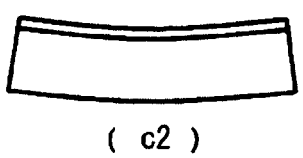

If this magnetic head slider 1 is set under the conditions of $T=T_1$ ($dT=T_1-T_0<0$), and the magnetic head slider 1 and the magnetic head slider contact section of the plate spring 9 are considered independently, then the respective lengths are $l_0+l_0\times\alpha_2\times dT$ $l_0+l_0\times\alpha_1\times dT$ (see FIG. 8(b1)). However actually the magnetic head slider 1 and the plate spring 9 are adhered to be a continuous body, so tensile stress is generated inside the magnetic head slider 1, and compressive stress is generated inside the plate spring, and a negative change of the crown value $h_1$ is generated, as shown in FIG. 8(c1).

Under the conditions of $T=T_2$ ($dT=T_2-T_0>0$), on the other hand, tensile stress is generated inside the plate spring 9 and compressive stress is generated inside the magnetic head slider 1, and positive change of the crown value is generated, as shown in FIG. 8(c2). In the present description, the $T=T_0$ status where the crown value is 0 is shown, but this is merely to simplify description, for the crown may essentially be any value in the $T=T_0$ status.

Now the relationship between the thermal expansion coefficient and the rate of change of the crown will be studied in more detail using the case of $T=T_1$ in FIG. 8. If the deformation value of the magnetic head slider 1 is $\lambda 2$ and the deformation value of the plate spring is $\lambda 1$ in an independent status at temperature $T=T1$, then $\lambda_2=l_0\times\alpha_2\times dT$ $\lambda_1=l_0\times\alpha_1\times dT.$ If the length of combining the face in combined status is $\lambda$, and the stress distribution inside has the next function with respect to the vertical direction, then the forces that work inside the magnetic head slider 1 and the plate spring 9 are respectively $P_2=b\times t_2\times(\lambda_2-\lambda)\times E_2/(2\cdot l_0)$ $P_1=b\times t_1\times(\lambda_1-\lambda)\times E_1/(2\cdot l_0),$ and $P_1+P_2=0$ since the components are continuous (here b is the contact area, and $E_1$ and $E_2$ are the Young's modulus of the magnetic head slider 1 and the plate spring 9 respectively). From the above expressions the following relational expression can be acquired.

$\lambda=(t_1\times E_1\times\lambda_1+t_2\times E_2\times\lambda_2)/(t_1\times E_1+t_2\times E_2)$  Expression (1)

Since the thickness of the plate spring 9 is sufficiently smaller than the thickness of the magnetic head slider 1, the length between the connection face and the magnetic header slider 1 is approximately $l_0-\lambda_2$.

If the crown value is h and the radius of curvature is r, then $(r-t_2):r=l_0-\lambda:l_0-\lambda_2$ $r:(\frac{1}{2})(l_0-\lambda_2)=(\frac{1}{2})(l_0-\lambda_2)=h$ and the following relational expression on the crown value is determined.

$h=(\lambda-\lambda_2)(l_0-\lambda_2)/(4\cdot t_2)$  Expression (2)

Figure 9:
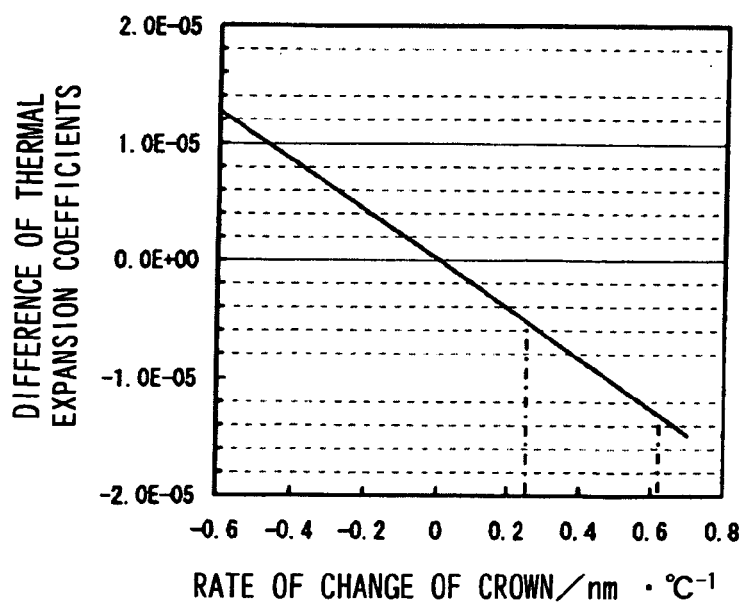
FIG. 9 is a graph depicting the relationship between the rate of change of crown and the difference of thermal expansion coefficients between the magnetic head slider and a plate spring.

The following values are substituted in the relationship of Expression (1) and Expression (2) and the relationship of the difference of the thermal expansion coefficients and the rate of change of the crown were determined, and the result is shown in FIG. 9.

$\alpha_2=7.8\times10^{-6}$/° C.
$E_1=14000$ Kgf/mm$^2$
$E_2=40000$ Kgf/mm$^2$
$l_0=1.2$ mm
$T_0=25$° C.
$T_1=-25$° C.
$t_1=0.035$ mm
$t_2=0.3$ mm When the thermal expansion coefficient difference is $-0.55 \times 10^{-6}/°C$ to $1.52 \times 10^{-6}/°C$, the variation of the crown with respect to the temperature is 0.26 nm/°C.–0.62 nm/°C. Therefore if the magnetic head slider 1 is made of alumina carbide titanate, then material with a thermal expansion coefficient of $0.23 \times 10^{-6}$ to $0.74 \times 10^{-6}$ is used for the plate spring 9 (or an alloy containing iron, nickel and cobalt may be used as another example of the material of the plate spring), then the flying height of the magnetic head slider 1 can be appropriately controlled with respect to the temperature, and the temperature dependency of the coercivity of the magnetic disk 2 can be cancelled in a temperature range wider than the prior art (−25° C. to 75° C. in this example), and a magnetic recording with high reliability can be implemented.

Figure 10:
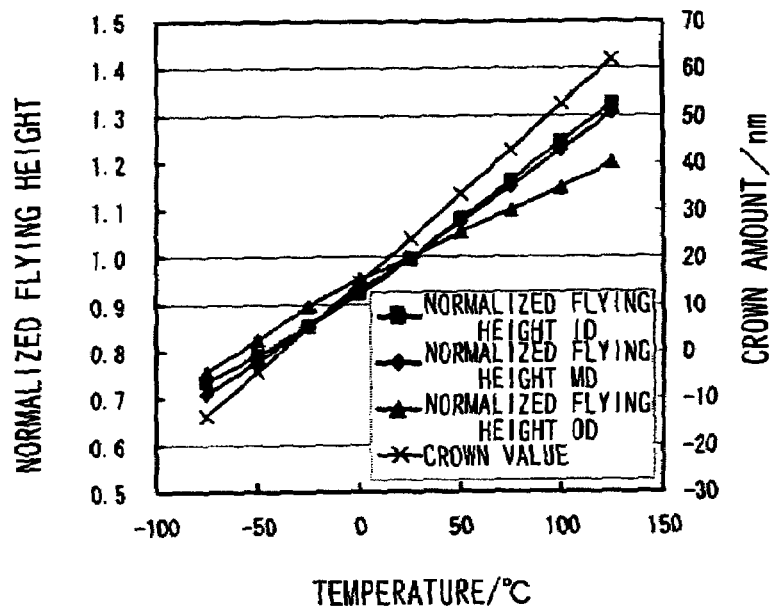
FIG. 10 is a graph depicting the crown value and the normalized flying height with respect to temperature according to Embodiment 1 of the present invention.
Figure 11:
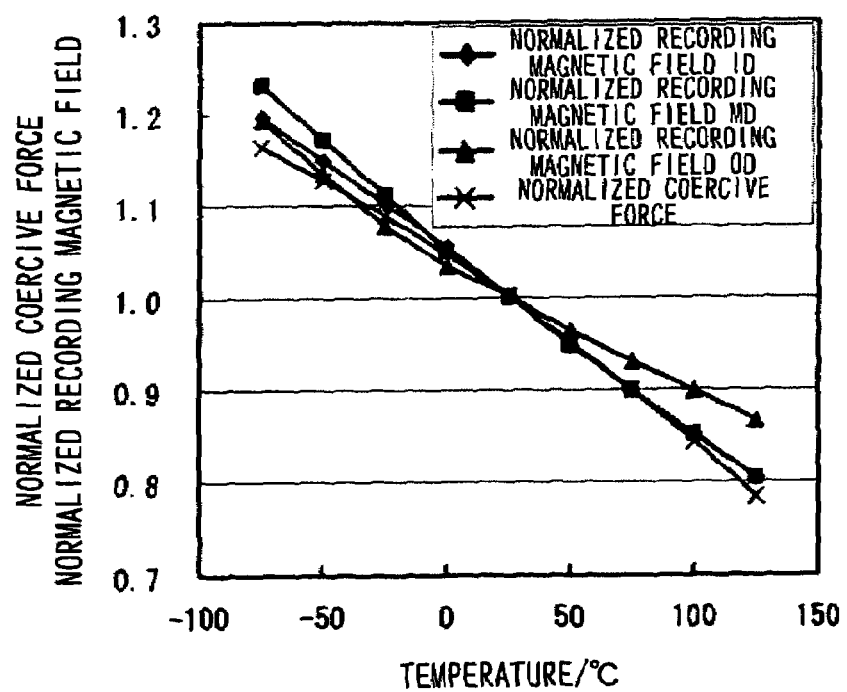
FIG. 11 is a graph depicting the normalized coercivity of the magnetic disk and the normalized recording magnetic field of the magnetic head slider with respect to temperature according to Embodiment 1 of the present invention.

FIG. 10 and FIG. 11 show the detailed analysis results when an invar-alloy (36Ni—Fe) having a $1.2 \times 10^{-6}$ thermal expansion coefficient is used for the plate spring 9 of the first embodiment of the present invention. FIG. 10 is a result of determining the change of the crown and the flying height with respect to each temperature by an analysis similar to FIG. 8 and by an analysis of the modified Reynolds equation respectively. FIG. 11 shows the normalized magnetic recording magnetic field calculated from the flying height analysis result of each temperature, which is shown along with the normalized coercivity of the magnetic disk 2. In Embodiment 1, in the temperature range of −50° C. to 100° C., the difference ratio of the recording magnetic field strength with respect to the coercivity is ±6% or less, and variations of the coercivity of the magnetic disk 2 can be cancelled, and a magnetic recording with high reliability can be implemented.

As described above, according to the first embodiment of the present invention, material of which the thermal expansion coefficient is smaller than that of the magnetic head slider 1 and the difference of the thermal expansion coefficients becomes $-0.55 \times 10^{-6}$ to $1.52 \times 10^{-6}$ is used for the plate spring 9, therefore a magnetic recording with reliability can be performed in a temperature range wider than the prior art.

(Embodiment 2)

Figure 12:
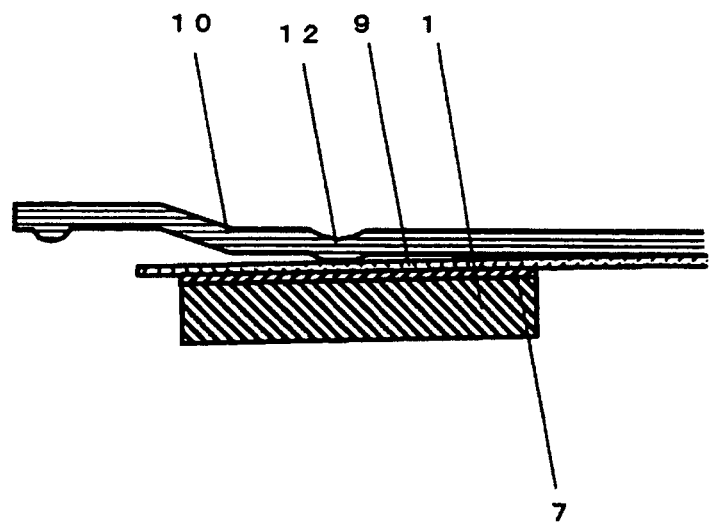
FIG. 12 is a cross-sectional view depicting a magnetic head assembly according to Embodiment 2 of the present invention.

FIG. 12 is a diagram depicting the configuration of the magnetic head assembly 3 according to the second embodiment of the present invention. In FIG. 12, a thin film 7 is formed on the rear face of the sliding surface for the magnetic disk 2 of the magnetic head slider 1, and the magnetic head slider 1 is adhered to the plate spring 9 which is a flexure thin plate via this thin film 7. The plate spring 9 contacts the load beam 10 via the dimple 12. The external size of the magnetic head slider 1 is about 1.2 mm×1.0 mm and the height is about 0.3 mm. The material of the magnetic head slider 1 is alumina carbide titanate, and for the thin film 7, a 36Ni—Fe alloy, which is an alloy of nickel and iron, is used. The thermal expansion coefficient of alumina carbide titanate is $7.8 \times 10^{-6}/°C$, and the thermal expansion coefficient of the 36Ni—Fe alloy is $1.2 \times 10^{-6}/°C$.

Figure 13:
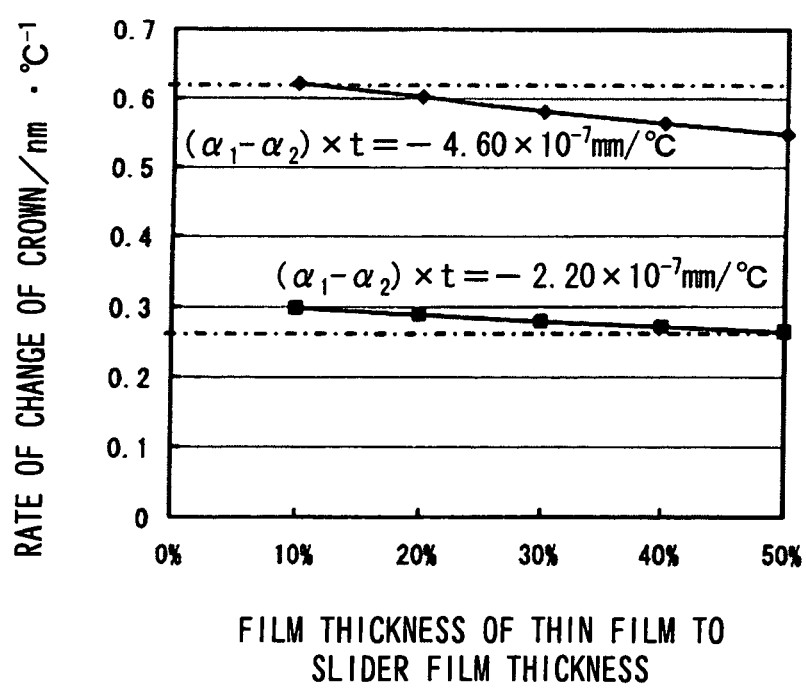
FIG. 13 is a graph depicting the relationship between film thickness of a thin film with respect to slider film thickness, and a crown value, according to Embodiment 2 of the present invention.

FIG. 13 shows the relationship between the rate of change of the crown and the film thickness t of the thin film 7 when the film thickness of the thin film 7 is t, the thermal expansion coefficient thereof is $\alpha_1$, and the thermal expansion coefficient of the magnetic head slider 1 is $\alpha_2$. The abscissa indicates a percentage of the film thickness t of the thin film 7 with respect to the film thickness of the magnetic head slider 1, and the ordinate indicates the rate of change of the crown. This analysis was performed using the same analysis method as Embodiment 1, which was described with reference to FIG. 8, and the parameter values used for calculation are the same as Embodiment 1.

When the film thickness of the thin film 7 is 10% to 50% of the film thickness of the magnetic head slider 1, and if $(\alpha_1-\alpha_2) \times t$ is in a $-2.20 \times 10^{-7}$ mm/°C. to $4.60 \times 10^{-7}$ mm/°C. range, the rate of change of the crown is 0.26 nm/°C. to 0.62 nm/°C. Therefore by designing the material and the thickness of the thin film to be $-2.20 \times 10^{-7}$ mm/°C. $>(\alpha^1-\alpha_2) \times t_1 > -4.6 \times 10^{-7}$ mm/°C., the flying height of the magnetic head slider 1 can be appropriately controlled with respect to the temperature and the temperature dependency of the coercivity of the magnetic disk 2 can be cancelled in a temperature range wider than the prior art (−25° C. to 75° C. in this example), and magnetic recording with high reliability can be implemented.

Figure 14:
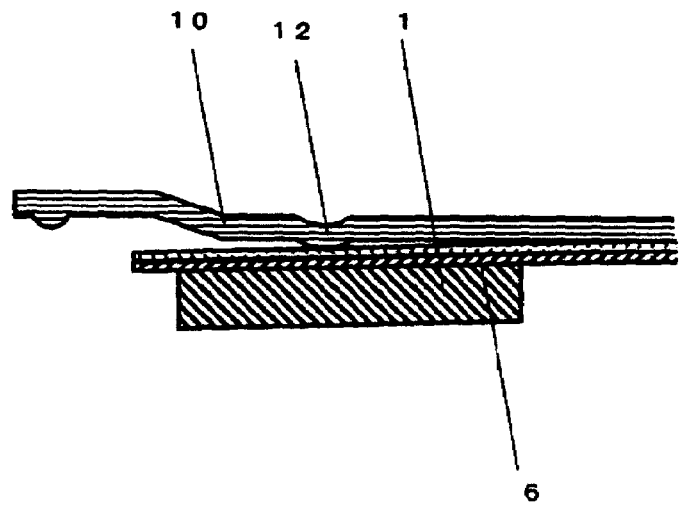
FIG. 14 is a cross-sectional view depicting the magnetic head assembly using a bi-metal as a plate spring.

In the first embodiment, the crown value is changed with respect to the change of the temperature using the difference of the thermal expansion coefficients of the magnetic head slider 1 and the plate spring 9, and in the second embodiment, the crown value is changed using the thermal expansion coefficient and the film thickness of the magnetic head slider 1 and the thin film 7 formed on the rear face of the magnetic head slider 1, but the present invention is not limited to these configurations, and the essential character of the present invention is that the variations of the coercivity of the magnetic disk 2 caused by the change of temperature is cancelled by controlling the flying height of the magnetic head slider 1 with respect to the temperature so as to be a low flying height at low temperatures and a high flying height at high temperatures, and as a result stable magnetic recording is performed in a temperature range which is wider than prior art. Therefore as FIG. 14 shows, the magnetic head assembly 3 with a rate of change of the crown in a 0.26 to 0.62 nm/°C. range can be constructed in the same way as Embodiments 1 and 2, using the plate spring 6 with a bi-metal structure, or the rate of change of the flying height with respect to the change of the temperature can be in a 0.15%/°C. to 0.45%/°C. range by changing not only the crown value but also by changing the static load applied on the magnetic head slider 1 from the plate spring 9 depending on the temperature.

(Embodiment 3)

Figure 15:
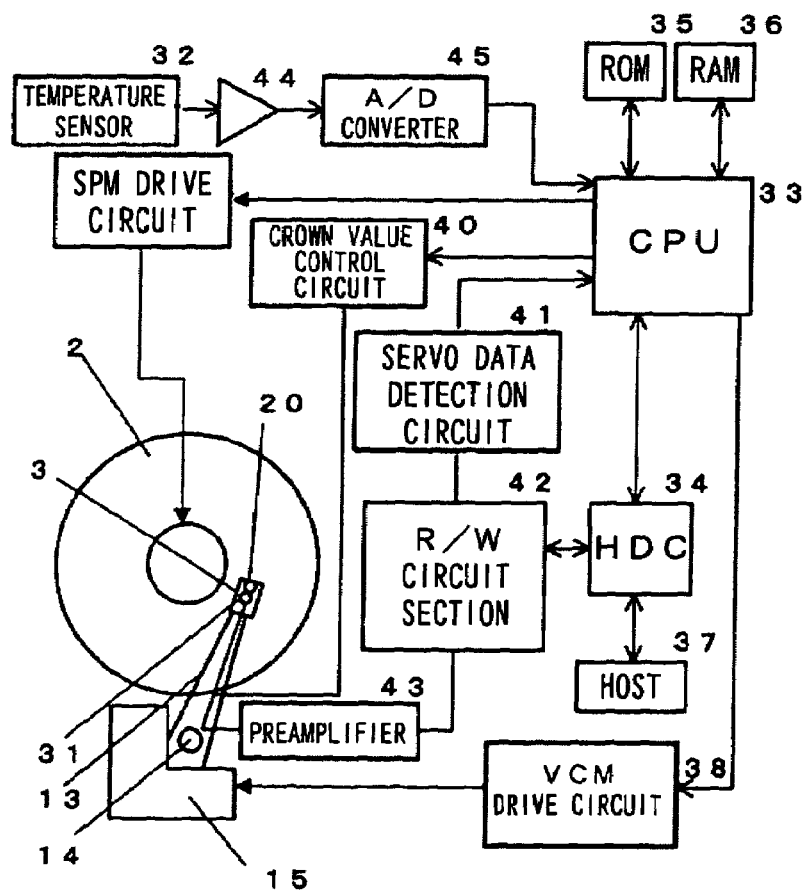
FIG. 15 is a block diagram depicting a general configuration of a magnetic disk drive according to Embodiment 3 of the present invention.
Figure 16:
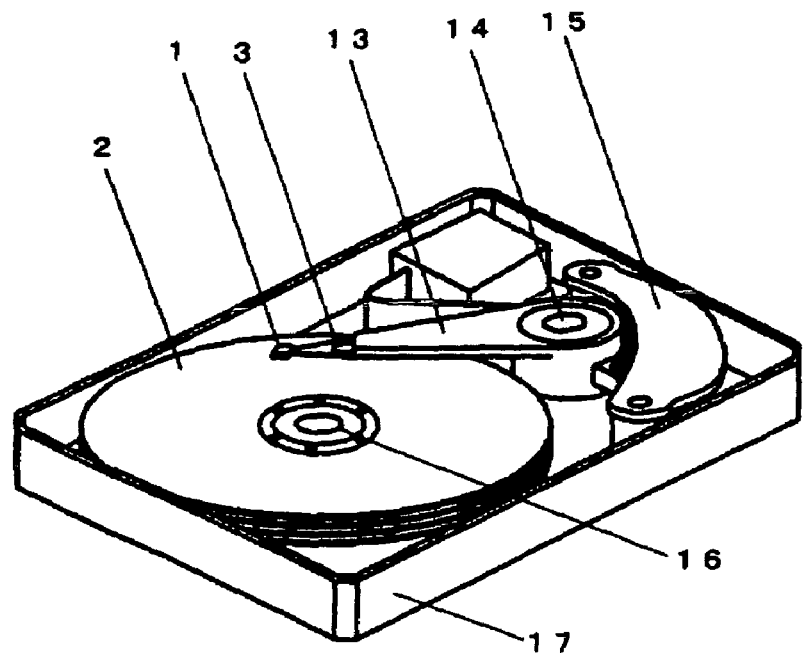
FIG. 16 is a diagram depicting a structure of a general magnetic disk drive.
Figure 17:
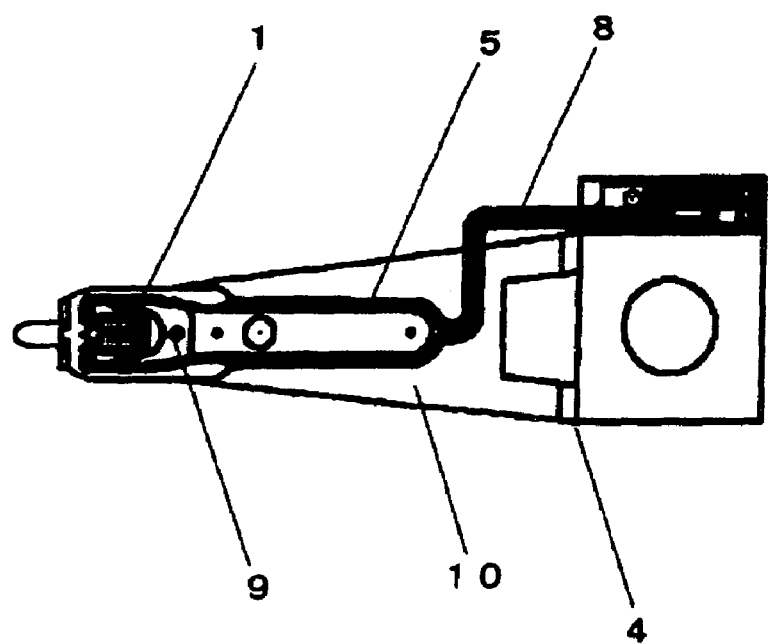
FIG. 17 is a diagram depicting details of a general magnetic head assembly.
Figure 18:
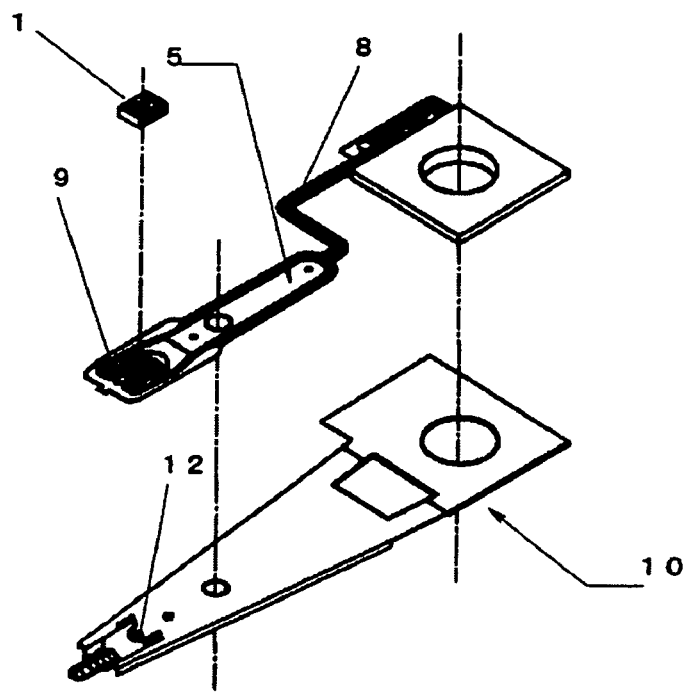
FIG. 18 is an exploded perspective view depicting a general magnetic head assembly.
Figure 19:
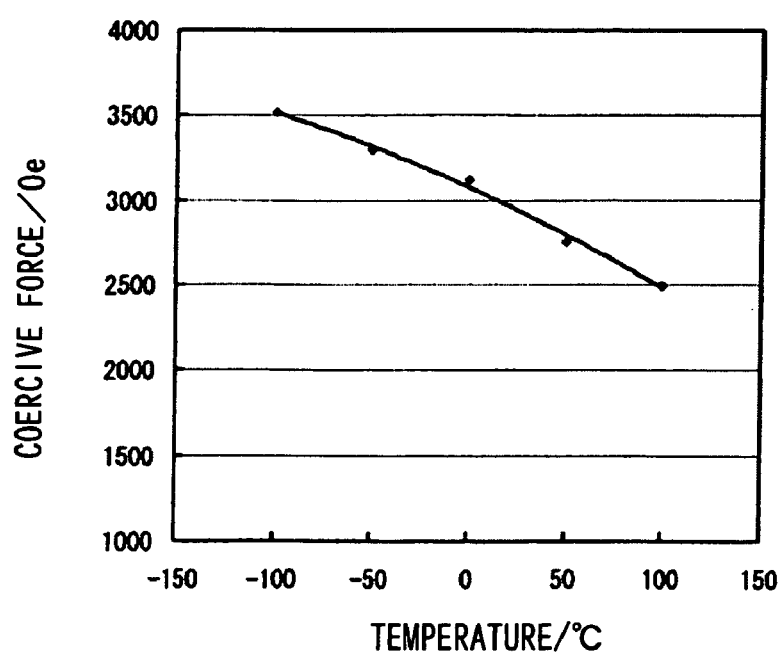
FIG. 19 is a graph depicting the relationship between temperature and coercivity of the magnetic disk.
Figure 20:
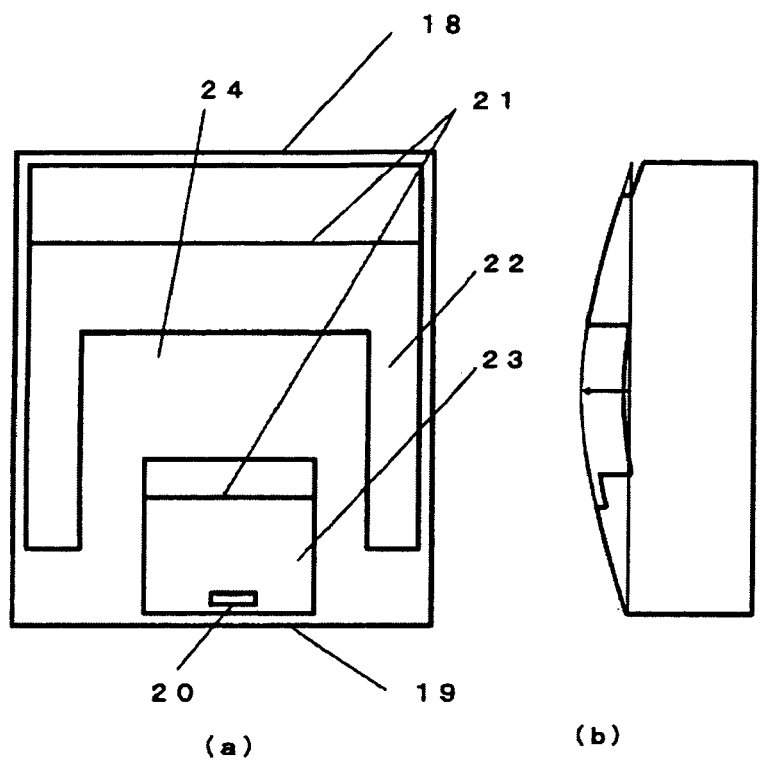
FIG. 20 is a diagram depicting the shape and configuration of a general magnetic head slider and the shape of its crown.

FIG. 15 is a block diagram depicting the configuration of the magnetic disk drive according to the third embodiment of the present invention.

In FIG. 15, the magnetic head assembly 3 comprises a magnetic head slider 1 on which a magnetic read/write element 20 for reading and writing information is mounted, a suspension 4 which further comprises a plate spring 9, a flexible circuit 8 and a load beam 10, and a piezoelectric element 31 which functions as the flying height control means. The read/write circuit section 42 comprises circuits which generate write signals, generate read information from the read signals amplified by the preamplifier 43, and modulate/demodulate the read/write signals, and the actuator mechanism 13 comprises an arm which supports the magnetic head assembly 3 and a drive mechanism for rotating this arm around a bearing 14 within a predetermined angle range, that is a voice coil motor 15. 38 is a voice coil motor drive circuit for driving the actuator mechanism 13, and supplies the required current to the voice coil motor so that the magnetic read/write element 20 on the magnetic head slider can position to a target track base don the control signal from the CPU 33, which will be described later.

The CPU 33 performs positioning control based on the servo data acquired from the servo data detection circuit 41 and commands, including read/write address information, which is input from the host 37 via the HDC 34. The CPU 33 loads the temperature detection information detected by the temperature sensor 32 via the amplification circuit 44 and the A/D converter 45, determines the flying height at which writing is possible with respect to the temperature by calculation or based on a table stored in the ROM 35 in advance, and adjusts the flying height by changing the crown value. Specifically the target crown value calculated by the CPU 33 or acquired based on a table stored in the ROM 35 in advance is input into the crown value control circuit 40, and the crown value control unit 40 applies control voltage to the piezoelectric element 31 to control the crown value of the magnetic head slider 1 to the optimum.

The rate of change of the flying height required for the desired temperature environment conditions, that is the rate of change of the crown in this case, is the same as Embodiment 1, so description thereof is omitted here.

As described above, according to Embodiment 3, the crown value is actively controlled based on the temperature information measured by the temperature sensor 32, so that the flying height of the magnetic head slider is adjusted and the temperature dependency of the coercivity of the magnetic disk 2 is cancelled, therefore magnetic recording with high reliability can be implemented.

In Embodiment 3, the target flying height is acquired by controlling the crown value of the magnetic head using the crown value control circuit 40, but the target flying height can be acquired by such a method as controlling the static load to be applied to the magnetic head slider 1, and a similar effect can be acquired by controlling the flying height using the flying height control means so as to be a low flying height at low temperatures and a high flying height at high temperatures based on the temperature detection result by the temperature detection means 32.

The invention claimed is:

1. A magnetic disk drive, comprising:
   a magnetic head slider (1) mounted thereon with a magnetic read/write element (20) to read and write information;
   a suspension (4) comprising a plate spring (9) of a thin plate shape for adhering to and supporting said magnetic head slider (1), a flexible circuit (8) and a load beam (10);
   a magnetic disk (2) for holding information;
   rotation drive (16) of said magnetic disk (2); and
   an actuator mechanism (13) for moving a magnetic head assembly (3) along the information recording surface of said magnetic disk (2), said actuator mechanism comprising said magnetic head slider (1) and said suspension (4), wherein
   said magnetic disk drive further comprises means for changing a flying height of said magnetic head slider (1) with respect to said magnetic disk (2) according to temperature in said magnetic disk drive, and means for particularly decreasing the flying height from the flying height at a room temperature of 25° C. when the temperature is lower than the room temperature and increasing the flying height from the flying height at the room temperature when the temperature is higher than the room temperature.

2. The magnetic disk drive according to claim 1, further comprising means for simply changing the flying height from the flying height at the room temperature status of 25° C. with respect to the temperature in a desired temperature range, wherein the average rate of change of the flying height caused by the change of temperature is in a range of 0.15%/° C. to 0.45%/° C.

3. A magnetic disk drive, comprising:
   a magnetic head slider (1) mounted thereon with a magnetic read/write element (20) to read and write information;
   a suspension (4) comprising a plate spring (9) of a thin plate shape for adhering to and supporting said magnetic head slider (1), a flexible circuit (8) and a load beam (10);
   a magnetic disk (2) for holding information;
   a rotation drive (16) of said magnetic disk (2); and
   an actuator mechanism (13) for moving a magnetic head assembly (3) along the information recording surface of said magnetic disk (2), said actuator mechanism comprising said magnetic head slider (1) and said suspension (4), wherein
   said magnetic disk drive further comprises a structure for generating stress in said magnetic head assembly (3) by the change of temperature, and said magnetic head slider (1) is decreased in crown value when the temperature is lower than a room temperature (25° C.), and the crown value of said magnetic head slider (1) is increased when the temperature is higher than the room temperature.

4. The magnetic disk drive according to claim 3, wherein the rate of change of the crown value caused by the change of temperature is 0.26 to 0.62 nm/° C. in a desired temperature range.

5. The magnetic disk drive according to claim 3, wherein the average rate of change of the flying height caused by the change of temperature from the flying height at the room temperature status (25° C.) is 0.15%/° C. to 0.45%/° C. in a desired temperature range.

6. A magnetic head assembly, comprising:
   a magnetic head slider (1) mounted thereon with a magnetic read/write element (20) to read and write information;
   a plate spring (9) of a thin plate shape for adhering to and supporting said magnetic head slider (1);
   a flexible circuit (8); and
   a load beam (10), wherein
   $13.2 \times 10^{-5}/°C. < \alpha_1 - \alpha_2 < -5.5 \times 10^{-5}/°C.$ is satisfied as a relationship of a thermal expansion coefficient $\alpha_1$ of said plate spring (9) and a thermal expansion coefficient $\alpha_2$ of said magnetic head slider (1).

7. The magnetic head assembly according to claim 6, wherein said magnetic head slider (1) contains alumina carbide titanate, and said plate spring (9) is made of an invar-alloy containing iron and nickel and having a thermal expansion coefficient of not more than $2.3 \times 10^{-5}/°C.$ 8. The magnetic head assembly according to claim 6, wherein said magnetic head slider (1) contains alumina carbide titanate, and said plate spring (9) is made of an alloy containing iron, nickel and cobalt and having a thermal expansion coefficient of not more than $2.3 \times 10^{-5}/°C.$ 9. A magnetic disk drive, comprising:
   a magnetic head slider (1) mounted thereon with a magnetic read/write element (20) to read and write information;
   a suspension (4) comprising a plate spring (9) of a thin plate shape for adhering to and supporting said magnetic head slider (1), a flexible circuit (8), and a load beam (10);
   a magnetic disk (2) for holding information;
   a rotation drive (16) of said magnetic disk (2); and an actuator mechanism (13) for moving a magnetic head assembly (3) along the information recording surface of said magnetic disk (2), said actuator mechanism comprising said magnetic head slider (1) and said suspension (4), wherein $-13.2\times10^{-5}/°\ C.<\alpha_1-\alpha_2<-5.5\times10^{-5}/°\ C.$ is satisfied as a relationship of a thermal expansion coefficient $\alpha_1$ of said plate spring (9) and a thermal expansion coefficient $\alpha_2$ of said magnetic head slider (1).

10. The magnetic disk drive according to claim 9, wherein said magnetic head slider (1) contains alumina carbide titanate, and said plate spring (9) is made of an invar-alloy containing iron and nickel and having a thermal expansion coefficient of not more than $2.3\times10^{-5}/°\ C.$ 11. The magnetic disk drive according to claim 9, wherein said magnetic head slider (1) contains alumina carbide titanate, and said plate spring (9) is made of an alloy containing iron, nickel and cobalt and having a thermal expansion coefficient of not more than $2.3\times10^{-5}/°\ C.$ 12. A magnetic head assembly (3), comprising:
a magnetic head slider (1) mounted thereon with a magnetic read/write element (20) to read and write information;
a plate spring (9) of a thin plate shape for adhering to and supporting said magnetic head slider (1);
a flexible circuit (8); and
a load beam (10), wherein
a thin film (7) is formed on a rear surface of the sliding face of said magnetic head slider (1) with respect to a magnetic disk (2), the thin film having a thermal expansion coefficient smaller than that of the material of said magnetic head slider (1).

13. The magnetic head assembly according to claim 12, wherein said magnetic head slider (1) contains alumina carbide titanate, and $-2.20\times10^{-7}\ mm/°\ C.>(\alpha^1-\alpha_2)\times t_1>-4.6\times10^{-7}\ mm/°\ C.$ is satisfied as a relationship of the thermal expansion coefficient $\alpha_1$ of said thin film (7), the film thickness $t_1$ thereof, and the thermal expansion coefficient $\alpha_2$ of said magnetic head slider (1).

14. The magnetic head assembly according to claim 12, wherein said magnetic head slider (1) contains alumina carbide titanate, and said thin film (7) has a film thickness of 10% to 50% of the thickness of said magnetic head slider (1).

15. A magnetic disk drive, comprising:
a magnetic head slider (1) mounted thereon with a magnetic read/write element (20) to read and write information;
a thin film (7) formed on a rear face of a sliding face of said magnetic head slider (1) for a magnetic disk (2);
a suspension (4) comprising a plate spring (9) of a thin plate shape for adhering to and supporting the rear face of said magnetic head slider (1) via the thin film (7), a flexible circuit (8) and a load beam (10);
a magnetic disk (2) for holding information;
rotation drive means (16) of said magnetic disk (2); and
an actuator mechanism (13) for moving a magnetic head assembly (3) which comprises said magnetic head slider (1) and said suspension (4) along the information recording surface of said magnetic disk (2), wherein
the thermal expansion coefficient of said thin film (7) is smaller than the thermal expansion coefficient of said magnetic head slider (1).

16. The magnetic disk drive according to claim 15, wherein said magnetic head slider (1) contains alumina carbide titanate, and $-2.20\times10^{-7}\ mm/°\ C.>(\alpha^1-\alpha_2)\times t_1>-4.6\times10^{-7}\ mm/°\ C.$ is satisfied as a relationship of the thermal expansion coefficient $\alpha_1$ of said thin film (7), the film thickness $t_1$ thereof, and the thermal expansion coefficient $\alpha_2$ of said magnetic head slider (1).

17. The magnetic disk drive according to claim 15, wherein said magnetic head slider (1) contains alumina carbide titanate, and the film thickness of said thin film (7) is 10% to 50% of the thickness of said magnetic head slider (1).

18. A magnetic head assembly (3) comprising:
a magnetic head slider (1) mounted thereon with a magnetic read/write element (20) to read and write information;
a plate spring (9) of a thin plate shape for adhering to and supporting said magnetic head slider (1);
a flexible circuit (8); and
a load beam (10), wherein
said plate spring (9) of a thin plate shape for adhering to and supporting said magnetic head slider (1) is constructed as a bi-metal structure of two thin plates with different thermal expansion coefficients.

19. A magnetic disk drive, comprising:
a magnetic head slider (1) mounted with a magnetic read/write element (20) to read and write information;
a suspension (4) comprising a plate spring (9) of a thin plate shape for adhering to and supporting said magnetic head slider (1), a flexible circuit (8) and a load beam (10);
a magnetic disk (2) for holding information;
rotation drive means (16) of said magnetic disk (2); and
an actuator mechanism (13) for moving a magnetic head assembly (3) comprising said magnetic head slider (1) and said suspension (4) along the information recording surface of said magnetic disk (2), wherein
said plate spring (9) of a thin plate shape for adhering to and supporting said magnetic head slider (1) is constructed as a bi-metal structure of two thin plates with different thermal expansion coefficients.

20. A magnetic disk drive, comprising:
a magnetic head slider (1) mounted thereon with a magnetic read/write element (20) to read and write information;
a suspension (4) comprising a plate spring (9) of a thin plate shape for adhering to and supporting said magnetic head slider (1), a flexible circuit (8) and a load beam (10);
a magnetic disk (2) for holding information;
rotation drive means (16) of said magnetic disk (2); and
an actuator mechanism (13) for moving a magnetic head assembly (3) comprising said magnetic head slider (1) and said suspension (4) along the information recording surface of said magnetic disk (2), wherein
said magnetic disk drive further comprises temperature detection means (32) for detecting the internal temperature of said magnetic disk drive, and flying height control means for changing a flying height of said magnetic head slider (1) with respect to said magnetic disk (2) based on the temperature detection result by said temperature detection means (32), and said plate spring (9) of a thin plate shape for adhering to and supporting said magnetic head slider (1) is constructed as a bi-metal structure of two thin plates with different thermal expansion coefficients.

21. The magnetic disk drive according to claim 20, wherein said flying height control means changes said flying height so that the flying height of said magnetic head slider (1) with respect to said magnetic disk (2) is decreased when the temperature is lower than the room temperature.

22. The magnetic disk drive according to claim 20, wherein said flying height control means changes said flying height so that the flying height of said magnetic head slider (1) with respect to said magnetic disk (2) is increased when the temperature is higher than the room temperature.

23. The magnetic disk drive according to claim 20, wherein said flying height control means changes the flying height so that the flying height of said magnetic head slider (1) with respect to said magnetic disk (2) is decreased when the temperature is lower than the room temperature, and the flying height of said magnetic head slider (1) with respect to said magnetic disk (2) is increased when the temperature is higher than the room temperature.

24. The magnetic disk drive according to claim 20, wherein the average rate of change of the flying height caused by the change of temperature from the flying height at the room temperature status (25° C.) is 0.15%/° C. to 0.45%/° C. in a desired temperature range.

25. A magnetic disk drive, comprising:
a magnetic head slider (1) mounted thereon with a magnetic read/write element (20) to read and write information;
a suspension (4) comprising a plate spring (9) of a thin plate shape for adhering to and supporting said magnetic head slider (1), a flexible circuit (8) and a load beam (10);
a magnetic disk (2) for holding information;
rotation drive means (16) of said magnetic disk (2); and
an actuator mechanism (13) for moving a magnetic head assembly (3) comprising said magnetic head slider (1) and said suspension (4) along the information recording surface of said magnetic disk (2), wherein
said magnetic disk drive further comprises temperature detection means (32) for detecting the internal temperature of said magnetic disk drive, and crown value control means (40) for changing the crown value of said magnetic head slider (1) based on the temperature detection result by said temperature detection means (32), said plate spring (9) of a thin plate shape for adhering to and supporting said magnetic head slider (1) is constructed as a bi-metal structure of two thin plates with different thermal expansion coefficients.

26. The magnetic disk drive according to claim 25, wherein the rate of change of the crown value caused by the change of temperature is 0.26 to 0.62 nm/° C. in a desired temperature range.

27. The magnetic disk drive according to claim 25, wherein the average rate of change of flying height caused by the change of temperature from the flying height at the room temperature status (25° C.) is 0.15%/° C. to 0.45%/° C. in a desired temperature range.

* * * * *